(12) United States Patent
Xu et al.

(10) Patent No.: US 10,843,361 B2
(45) Date of Patent: Nov. 24, 2020

(54) CONTROL OF A METAL-CUTTING MACHINING PROCESS BY MEANS OF P-CONTROLLER AND A LOAD-DEPENDENT CONTROL FACTOR BASED ON A CONTROL DEVIATION E(T) BETWEEN A CONTROL QUANTITY Y(T) AND A GUIDE QUANTITY W(T)

(71) Applicant: ZF Friedrichshafen AG

(72) Inventors: Yiwen Xu, Tiefenbach (DE); Herman Yakaria, Langenargen (DE); Tobias Kösler, Friedrichshafen (DE); Thomas Ackermann, Ravensburg (DE); Falko Fahnauer, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 231 days.

(21) Appl. No.: 15/577,630

(22) PCT Filed: Apr. 26, 2016

(86) PCT No.: PCT/EP2016/059230
§ 371 (c)(1),
(2) Date: Nov. 28, 2017

(87) PCT Pub. No.: WO2016/192903
PCT Pub. Date: Dec. 8, 2016

(65) Prior Publication Data
US 2018/0133917 A1    May 17, 2018

(30) Foreign Application Priority Data

May 29, 2015 (DE) .......... 10 2015 209 916

(51) Int. Cl.
*B26D 5/00* (2006.01)
*G05B 19/41* (2006.01)
(Continued)

(52) U.S. Cl.
CPC .......... *B26D 5/005* (2013.01); *G05B 19/406* (2013.01); *G05B 19/4163* (2013.01); *G05B 2219/45044* (2013.01)

(58) Field of Classification Search
CPC .. B26D 5/005; G05B 19/406; G05B 19/4163; G05B 2219/45044
See application file for complete search history.

(56) References Cited

U.S. PATENT DOCUMENTS 3,705,339 A * 12/1972 Rhoades ............... G05B 19/182
                                                                    318/571
3,984,746 A * 10/1976 Dinsdale ............... B23F 23/006
                                                                    318/571

(Continued)

FOREIGN PATENT DOCUMENTS

CH          423495       10/1966
DE       102013005044     9/2014
(Continued)

*Primary Examiner* — Mohammad Ali
*Assistant Examiner* — Kelvin Booker
(74) *Attorney, Agent, or Firm* — Cozen O'Connor

(57) ABSTRACT

A method for controlling a cutting machining process on a machine tool by a P-controller that changes a controlled variable u(t) affecting the cutting machining process based on a control deviation e(t) between a control quantity y(t) and a guide quantity w(t). To improve the control, the control factor (K) of the P-controller is variable and determined depending on instantaneous value of the control quantity y(t) via load characteristic fields. Each load characteristic field specifies a predetermined control factor for a defined value or value range of the control quantity y(t). Further disclosed is a control device for a cutting machine tool, a cutting machine tool, and a process for the cutting machining of a workpiece.

15 Claims, 1 Drawing Sheet

(51) Int. Cl.
*G05B 19/416* (2006.01)
*G05B 19/406* (2006.01)

(56) References Cited

U.S. PATENT DOCUMENTS

| | | | | |
|---|---|---|---|---|
| 4,208,155 A * | 6/1980 | Sabbioni | ............ | B23F 3/00 409/15 |
| 4,446,408 A * | 5/1984 | Ebermann | ............ | G05B 19/4065 318/565 |
| 4,509,126 A * | 4/1985 | Olig | ............ | G05B 19/4163 318/561 |
| 4,535,571 A * | 8/1985 | Smith | ............ | B24B 53/00 451/21 |
| 4,535,572 A * | 8/1985 | Smith | ............ | B24B 53/00 125/11.03 |
| 4,553,355 A * | 11/1985 | Smith | ............ | B24B 53/00 125/11.03 |
| 4,555,873 A * | 12/1985 | Smith | ............ | B24B 53/00 451/21 |
| 4,629,956 A * | 12/1986 | Nozawa | ............ | G05B 19/253 318/616 |
| 4,663,721 A * | 5/1987 | Herscovici | ............ | G05B 19/4163 700/160 |
| 4,695,960 A * | 9/1987 | Reimann | ............ | G05B 19/186 700/160 |
| 4,791,575 A * | 12/1988 | Watts, Jr. | ............ | G05B 19/184 318/569 |
| 4,811,528 A * | 3/1989 | Sommer | ............ | B23F 5/00 409/13 |
| 5,245,793 A * | 9/1993 | Schmitz | ............ | B24B 35/00 451/14 |
| 5,260,879 A * | 11/1993 | Sasaki | ............ | B23F 23/006 409/2 |
| 5,355,705 A * | 10/1994 | Schulze | ............ | B21D 22/16 72/81 |
| 5,539,172 A * | 7/1996 | Takase | ............ | B23F 17/006 219/69.2 |
| 5,777,450 A * | 7/1998 | Kono | ............ | G05B 19/406 318/568.11 |
| 5,883,482 A * | 3/1999 | Hocht | ............ | B23F 23/006 318/561 |
| 5,917,726 A * | 6/1999 | Pryor | ............ | G05B 19/41875 29/712 |
| 6,056,487 A * | 5/2000 | Brehmer | ............ | B23F 5/22 409/11 |
| 6,087,613 A * | 7/2000 | Buda | ............ | B23K 11/257 219/110 |
| 6,097,168 A * | 8/2000 | Katoh | ............ | 318/560 |
| 6,450,740 B1 * | 9/2002 | Mundhenke | ............ | B23F 5/20 409/11 |
| 6,681,145 B1 * | 1/2004 | Greenwood | ............ | B25J 9/1692 700/176 |
| 6,839,656 B1 * | 1/2005 | Ackermann | ............ | G06Q 40/06 705/36 R |
| 2002/0019195 A1 * | 2/2002 | Asano | ............ | B24B 49/16 451/8 |
| 2003/0102070 A1 * | 6/2003 | Black | ............ | B29C 35/0288 156/64 |
| 2004/0111185 A1 * | 6/2004 | Gmeiner | ............ | B23K 26/0884 700/245 |
| 2004/0167659 A1 | 8/2004 | Scherer | | |
| 2005/0077271 A1 * | 4/2005 | Delzenne | ............ | B23K 10/006 219/121.44 |
| 2005/0265800 A1 * | 12/2005 | Endo | ............ | G05B 19/186 409/2 |
| 2008/0065257 A1 | 3/2008 | He | | |
| 2010/0295496 A1 * | 11/2010 | Okita | ............ | G05B 19/425 318/561 |
| 2013/0204404 A1 * | 8/2013 | Kerner | ............ | G05B 19/404 700/56 |
| 2013/0322977 A1 | 12/2013 | Masakazu | | |
| 2015/0093967 A1 * | 4/2015 | Diehl | ............ | B24B 9/065 451/5 |
| 2015/0234373 A1 * | 8/2015 | Myers | ............ | G05B 19/409 700/170 |

FOREIGN PATENT DOCUMENTS

EP 0721695 B1 8/1997
WO WO 95/10135 4/1995

* cited by examiner

CONTROL OF A METAL-CUTTING MACHINING PROCESS BY MEANS OF P-CONTROLLER AND A LOAD-DEPENDENT CONTROL FACTOR BASED ON A CONTROL DEVIATION E(T) BETWEEN A CONTROL QUANTITY Y(T) AND A GUIDE QUANTITY W(T)

PRIORITY CLAIM

This is a U.S. national stage of application No. PCT/EP2016/059230, filed on 26 Apr. 2016. Priority is claimed on the following application: Country: Germany, Application No.: 102015209916.4, Filed: 29 May 2015; the content of which is incorporated herein by reference in its entirety.

BACKGROUND OF THE INVENTION

1. Field of the Invention

One aspect of the invention is directed to a method for controlling a cutting machining process on a cutting machine tool and further directed to a control device for a cutting machine tool, a cutting machine tool, and a process for cutting machining of a workpiece.

2. Description of the Prior Art

In cutting or chip-removing workpiece machining, the machining process can be controlled in order, for example, to ensure a required workpiece quality or component part quality and/or to ensure an efficient machining process (for example, with respect to energy consumption, tool wear, machining time, or the like).

For the control of a cutting machining process, relevant quantities correlating with the fluctuating process load (mechanical and thermal load) between tool and workpiece can be received during the machining process through signal detection. Quantities of this kind are, e.g., the forces occurring at the machine axes of the machine tool and/or the output or power consumption of the machine drives. An actual quantity or control quantity y(t) can be formed from the detected signals and compared with a reference quantity or guide quantity w(t) that has been determined beforehand. The control aims to minimize the control deviation or control differential e(t) resulting from the comparison of the control quantity y(t) and guide quantity w(t) by changing a controlled variable u(t), which is accomplished by a controller, as it is called. Mostly P-controllers (proportional controllers) are used with cutting machine tools.

SUMMARY OF THE INVENTION

It is an object of one aspect of the invention to improve the control of a cutting machining process on a machine tool.

One aspect of the invention extends to a control device for a cutting machine tool, to a cutting machine tool and to a process for cutting machining of a workpiece.

The method according to one aspect of the invention for controlling a cutting machining process on a machine tool employs or uses a P-controller that determines and changes a controlled variable u(t) affecting the cutting machining process based on the control deviation e(t) between the control quantity y(t) and the guide quantity w(t). According to one aspect of the invention, the control factor K or the gain of the P-controller is variable and is determined depending on the instantaneous value of the control quantity y(t) (automatically) via load characteristic fields which have been defined beforehand and selected from these previously defined load characteristic fields, and each load characteristic field specifies a predetermined control factor K for a defined value or value range of the control quantity y(t).

A P-controller is characterized in that there is a linear dependency between the actual value of the control quantity y(t) or of the control deviation e(t) and the controlled variable u(t). The relationship between the control deviation e(t) and the controlled variable u(t) can be described by the P-controller equation u(t)=K·e(t), where e(t)=w(t)−y(t). The value K is designated as control factor or also as gain. The value w(t) is the guide quantity which may be defined as limit quantity and as limit curve. The actual value of the control quantity y(t) can be determined through signal detection or measured by measurement.

Within the meaning of the invention, a PI-controller (which works integrally in addition) or a PID-controller (which works integrally and differentially in addition) is also regarded as a P-controller.

A force acting at a machine axis of the machine tool or the output of a machine drive of the machine tool, particularly the drive output of a tool spindle drive, can be used as control quantity y(t).

The feed rate of the tool, particularly a milling tool or grinding tool, or the feed rate of a tool spindle receiving the tool or the rotational speed of the tool can be used as controlled variable u(t). Both have an influence on the machining speed, particularly on the cutting speed or grinding speed.

Three load characteristic fields are preferably provided that specify a control factor for an overload range of the cutting machining, an underload range of the cutting machining and a target load range of the cutting machining, respectively. In a particularly preferred manner, the control factor for the target load range has a value of zero (0) to prevent continuous controlling in the target load range. There is almost no controlling in the target load range, i.e., there is no change in the controlled variable. The control factor for the underload range can be determined by multiplying the control factor for the overload range by a safety factor (<1) to produce a more sluggish control behavior in the underload range as opposed to the overload range. Also, less than three or more than three load characteristic fields can be provided.

The control device (control arrangement) for a cutting machine tool in accordance with one aspect of the invention is constructed for controlling a cutting machining process on the machine tool in question by a P-controller that, based on the control deviation e(t) between the guide quantity w(t) and the control quantity y(t), the P-controller determines or changes a controlled variable u(t) influencing the cutting machining process, and the control factor K of the P-controller is variable and is determined depending on the instantaneous value of the control quantity y(t) via load characteristic fields, which have been defined beforehand, for which purpose each load characteristic field specifies a predetermined control factor K for a defined value or value range of the control quantity y(t).

The control device according to one aspect of the invention can be a computer device or the like with a suitable software program. The control device according to the invention can include a plurality of partial control devices. Further developments and arrangements of this kind follow in an analogous manner from the foregoing and following description.

The cutting machine tool according to one aspect of the invention has a control device that enables the control of a cutting machining process by the method. This machine tool is preferably a milling machine and/or grinding machine, particularly a hobbing machine and/or gear grinding machine for producing and/or machining gear teeth.

The process for the cutting machining of a workpiece includes a controlling of the cutting machining process and/or is carried out on a machine tool. The workpiece to be machined is, in particular, a gearwheel blank for producing a gear by (continuous) hobbing or grinding of the gear teeth. Further developments and arrangements follow in an analogous manner from the preceding description and the following description.

BRIEF DESCRIPTION OF THE DRAWINGS

The invention will be described more fully in the following with reference to the figures in the drawing. Even in the absence of specific combinations of features, the features shown in the figures and/or described in the following can further develop the invention.

DETAILED DESCRIPTION OF THE PRESENTLY PREFERRED EMBODIMENTS

Figure 1:
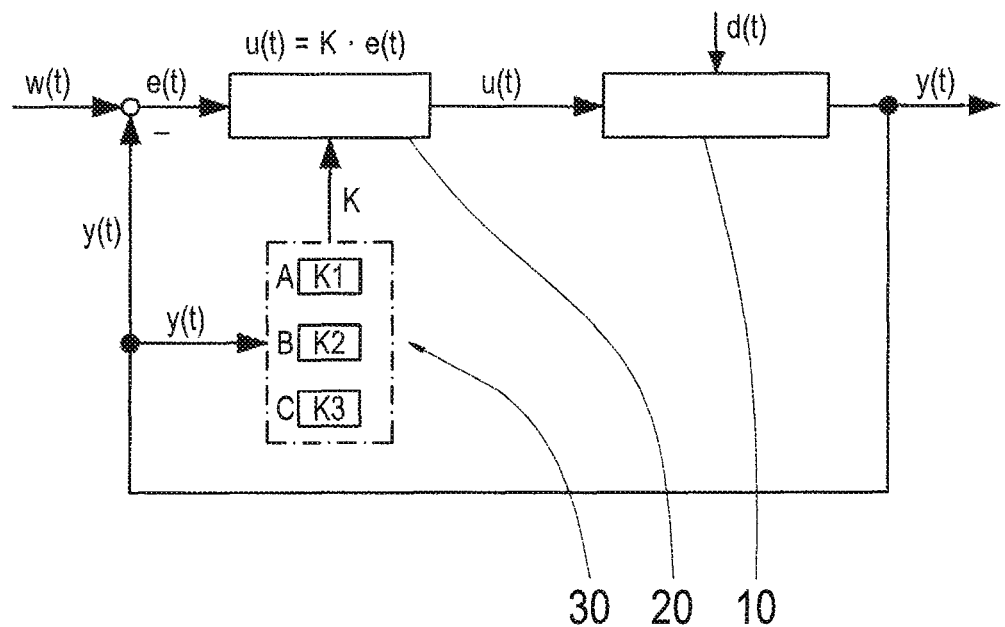
FIG. 1 schematically shows the controlling of a cutting machining process on a machine tool in which the control factor is determined based on load characteristic fields.

The cutting machining process to be controlled is designated by 10 in FIG. 1. As a result of operative disturbance variables $d(t)$, the process load (mechanical and thermal load) between tool and workpiece undergoes fluctuations that are compensated by controlling by a P-controller 20.

To this end, a control quantity $y(t)$, e.g., the force occurring at a machine axis of the machine tool or the output of a machine drive of the machine tool, is detected or measured during the machining process. The control quantity $y(t)$ is compared with a previously determined guide quantity $w(t)$, and a control deviation $e(t)$ is determined by subtraction ($w(t)-y(t)$). Based on the control deviation $e(t)$, the P-controller 20 influences the cutting machining process 10 by changing a controlled variable $u(t)$, e.g., the feed rate or rotational speed of the tool, in such a way that the control differential $e(t)$ is minimized. The relationship between the controlled variable $d(t)$ and the control differential $e(t)$ is described by the P-controller equation $u(t)=K \cdot e(t)$, where the value $K$ is designated as control factor.

The invention provides that the control factor K of P-controller 20 is not constant but rather is load-dependent and, therefore, variable. The control factor K is determined during the cutting machining process 10 as a function of the instantaneous value of the control quantity $y(t)$ via previously defined load characteristic fields A, B and C, each of these load characteristic fields specifying a predetermined control factor K1, K2 or K3 for a defined value or value range of control quantity $y(t)$. This will be explained in the following referring to FIG. 2.

Figure 2:
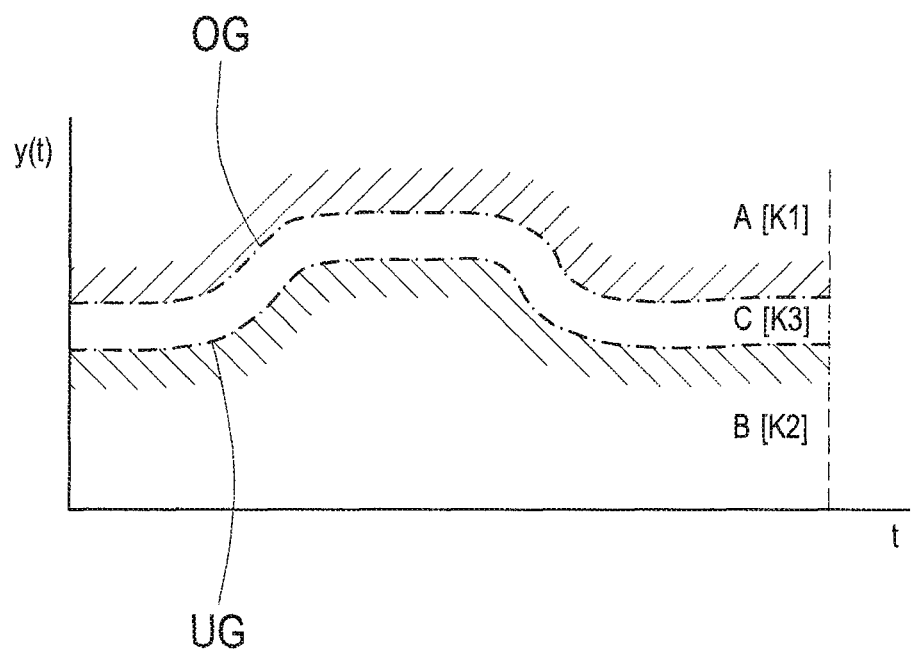
FIG. 2 is a diagram showing the load characteristic fields for determining the control factor during the control according to FIG. 1.

FIG. 2 shows three previously defined load characteristic fields A, B and C for the cutting machining process 10, and the load characteristic fields A, B and C are defined depending on the machining time t (or alternatively, for example, depending on the forward feed path).

The top load characteristic field A is the overload range. When the instantaneous value of the detected or measured control quantity $y(t)$ lies in this range, the machining process 10 is overloaded ($y(t)>w(t)$); that is, the process load is too high so that, for example, tool wear increases and/or the required machining quality is not achieved. Control factor K1 is associated with the overload range A, where this control factor K1 is automatically selected and is the basis of the present control by the P-controller 20.

The bottom load characteristic field B is the underload range. When the instantaneous value of the control quantity $y(t)$ lies in this range, the machining process 10 is underloaded ($y(t)<w(t)$) and is accordingly inefficient, for example. The control factor K2 is associated with the underload range B, and this control factor K2 is automatically selected and is the basis of the present controlling by P-controller 20. The control factor K2 for the underload range B can be formed by multiplying the control factor K1 for the overload range A by a safety factor SF ($K2=SF \cdot K1$, where $SF>1$). In this way, a more sluggish control behavior is generated in the underload range B so that the process load only increases slowly and the exceedance of the process load limit OG is possibly prevented.

The middle load characteristic field C is the target load range. The limit curve OG to the overload range A corresponds to the curve of the guide quantity $w(t)$ (a constant curve, i.e., $w(t) =$const., can also be provided, which effectively corresponds to a fixed value) so that this limit curve OG can also be referred to as process load limit. The limit curve UG to the underload range B, the so-called control limit, can be generated by parallel displacement (offsetting) of the process load limit OG, for example, by a determined percentage. The control limit OG is preferably configured while taking into account the compensating accuracy to be achieved. Accordingly, the target range C has the property of a tolerance of the compensating accuracy of control differentials. If the instantaneous value of the control quantity $y(t)$ is in this target load range C, the required process load is achieved. A control factor K3 having the value zero (0) is associated with the target load range C so that no change takes place in the controlled variable $u(t)$, which effectively prevents the control for as long as the instantaneous value of the control quantity $y(t)$ is located within this target load range C.

Each load characteristic field A, B and C specifies a predetermined control factor K1, K2 and K3 for a defined value or value range of the control quantity $y(t)$. Classification or association is carried out through comparison in a so-called pre-control 30 that determines or defines the applicable control factor K1, K2 or K3 for the present control and sends it to the P-controller 20. The pre-control 30 can be a hardware module and/or software module that can also be added to existing control devices particularly also subsequently. The load characteristic fields A, B and C can be stored, for example, defined or programmed in a process-dependent and/or workpiece-dependent manner and recalled and used when needed. In particular, a (virtual) catalogue can possibly also be stored.

The advantage of the control according to one aspect of the invention depending upon load characteristic fields consists, for one, in that it is possible to configure the P-controller without specific knowledge of the finishing machining process being used or employed. For configuration, the control factor K need only be determined theoretically or experimentally. The control limit UG and the safety factor SF can be defined generally or specifically according to the required control tasks. This considerably reduces expenditure for configuring the P-controller. Further, typical disadvantages of a P-controller, particularly the constant controlling (inability to completely switch off the control) and inflexibility during control, are prevented.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for controlling a continuous cutting machining process on a machine tool by a P-controller comprising:
   receiving by the P-controller a control quantity y(t) determined by one of signal detection and measurement;
   changing, by the P-controller, a controlled variable u(t) that affects the continuous cutting machining process based at least in part on a control deviation e(t) between the control quantity y(t) and a guide quantity w(t), wherein the guide quantity w(t) is at least one of a limit quantity and a limit curve, such that u(t)=Ke(t), where e(t)=w(t)-y(t); and
   determining a control factor (K) of the P-controller based at least in part on instantaneous value of the control quantity y(t) via at least one load characteristic field (A, B, C),
   wherein the control factor (K) is variable and the at least one load characteristic field (A, B, C) is predefined, and
   wherein the at least one load characteristic field (A, B, C) specifies a predetermined control factor (K1, K2, K3) for one of a defined value of the control quantity y(t) or a value range of the control quantity y(t),
   wherein there is a linear dependency between an actual value of the control quantity y(t) or of the control deviation e(t) and the controlled variable u(t),
   wherein the controlled variable u(t) is one of:
   a feed rate of the machine tool or
   a rotational speed of the machine tool.

2. The method according to claim 1, wherein the control quantity y(t) is one of: a force acting at a machine axis of the machine tool or an output of a machine drive of the machine tool.

3. The method according to claim 1, wherein three load characteristic fields (A, B, C) are provided that specify a respective control factor (K1, K2, K3) for an overload range, an underload range, and a target load range.

4. The method according to claim 3, wherein the control factor (K3) for the target load range (C) has a value of zero.

5. The method according to claim 3, wherein the control factor (K2) for the underload range (B) is determined by multiplying the control factor (K1) for the overload range (A) by a safety factor (SF).

6. The method according to claim 5, wherein the safety factor is greater than 1.

7. The method according to claim 6, wherein a response time in the underload range is slower that a response time in the overload range.

8. The method according to claim 1, wherein a relationship between the control deviation e(t) and the controlled variable u(t) is described by u(t)=Ke(t), where e(t)=w(t)-y(t).

9. The method according to claim 1, wherein the cutting machining process on the machine tool comprises producing a gear by one of continuous hobbing and grinding.

10. The method according to claim 1, wherein the control factor K is load-dependent.

11. The method according to claim 1, wherein a precontrol determines the control factor and sends it to the P-controller.

12. A control device for a cutting machine tool configured to control a continuous cutting machining process on a machine tool by a P-controller, the control device configured to:
   receive a control quantity y(t) determined by one of signal detection and measurement
   change a controlled variable u(t) influencing the continuous cutting machining process based on a control deviation e(t) between the control quantity y(t) and a guide quantity w(t), wherein the guide quantity w(t) is at least one of a limit quantity and a limit curve;
   determine a variable control factor (K) depending on an instantaneous value of the control quantity y(t) via at least one load characteristic field (A, B, C) that has been predefined such that u(t)=Ke(t), where e(t)=w(t)-y(t),
   wherein the at least one load characteristic field (A, B, C) specifies a predetermined control factor (K1, K2, K3) for a defined value or value range of the control quantity y(t),
   wherein the controlled variable u(t) is one of:
   a feed rate of the machine tool or
   a rotational speed of the machine tool.

13. A machine tool comprising:
   a control device for a cutting machine tool configured to control a continuous cutting machining process on the machine tool by a P-controller, the control device configured to:
   receive a control quantity y(t) determined by one of signal detection and measurement
   change a controlled variable u(t) influencing the continuous cutting machining process based on a control deviation e(t) between the control quantity y(t) and a guide quantity w(t), wherein the guide quantity w(t) is at least one of a limit quantity and a limit curve;
   determine a variable control factor (K) depending on an instantaneous value of the control quantity y(t) via at least one load characteristic field (A, B, C) that has been predefined such that u(t)=Ke(t), where e(t)=w(t)-y(t),
   wherein the at least one load characteristic field (A, B, C) specifies a
   predetermined control factor (K1, K2, K3) for a defined value or value range of the control quantity y(t),
   wherein there is a linear dependency between an actual value of the control quantity y(t) or of the control deviation e(t) and the controlled variable u(t),
   wherein the controlled variable u(t) is one of:
   a feed rate of the machine tool or
   a rotational speed of the machine tool.

14. The machine tool according to claim 13, wherein the machine tool is at least one of a milling machine and a grinding machine.

15. The machine tool according to claim 13, wherein a relationship between the control deviation $e(t)$ and the controlled variable $u(t)$ is described by $u(t)=Ke(t)$, where $e(t)=w(t)-y(t)$.

* * * * *